United States Patent
Thoziyoor et al.

(10) Patent No.: US 8,495,537 B1
(45) Date of Patent: Jul. 23, 2013

(54) TIMING ANALYSIS OF AN ARRAY CIRCUIT CROSS SECTION

(75) Inventors: Shyamkumar Thoziyoor, Austin, TX (US); Tae H. Kim, Chandler, AZ (US); Sang Y. Lee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/349,325

(22) Filed: Jan. 12, 2012

(51) Int. Cl.
*G06F 17/50* (2006.01)
(52) U.S. Cl.
USPC ........... 716/108; 716/113; 716/132; 716/134; 716/136
(58) Field of Classification Search
USPC .. 716/108, 113, 132, 134, 136; 702/117–118, 702/120, 124, 125; 714/718, 724, 731; 365/194, 365/201
See application file for complete search history.

(56) References Cited

U.S. PATENT DOCUMENTS

| | | | |
|---|---|---|---|
| 4,593,351 A | 6/1986 | Hong et al. | |
| 6,714,902 B1 * | 3/2004 | Chao et al. | 703/14 |
| 7,299,434 B2 * | 11/2007 | Iguchi | 716/108 |
| 7,380,228 B2 | 5/2008 | Fry et al. | |
| 7,424,691 B2 * | 9/2008 | Agarwal et al. | 716/113 |
| 7,434,187 B2 | 10/2008 | Brahme et al. | |
| 7,516,383 B2 * | 4/2009 | Hirano | 714/741 |
| 7,552,413 B2 | 6/2009 | Agarwal et al. | |
| 7,584,442 B2 | 9/2009 | Andreev et al. | |
| 7,941,774 B2 | 5/2011 | Luan et al. | |
| 2011/0041109 A1 | 2/2011 | Kengeri et al. | |
| 2011/0131540 A1 | 6/2011 | Wu et al. | |

* cited by examiner

*Primary Examiner* — Nghia Doan
(74) *Attorney, Agent, or Firm* — Paul S. Drake

(57) ABSTRACT

A method, system or computer usable program product for performing timing analysis on an array circuit including receiving in memory a set of pins to be timed, selecting with a data processor a cross section of the array circuit including the set of pins wherein a backtrace is performed from the set of pins to identify a set of bus groups, each bus group having a plurality of timing pins, and assigning timing for an assigned pin of a first bus group equal to timing calculated for a surrogate pin of the first bus group based on array circuit regularity.

20 Claims, 12 Drawing Sheets

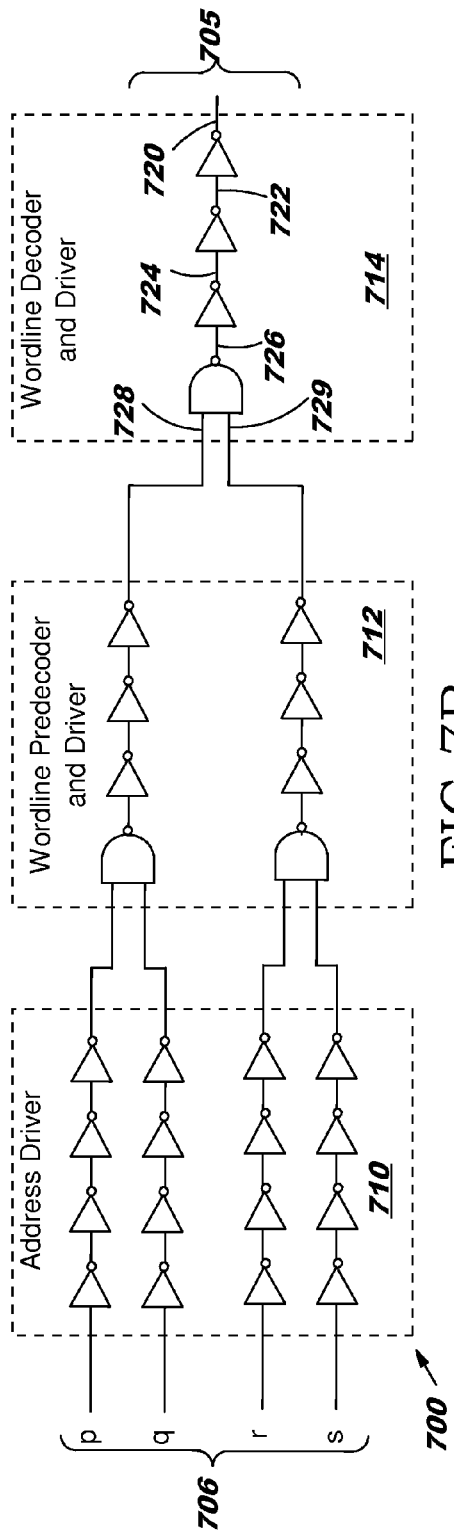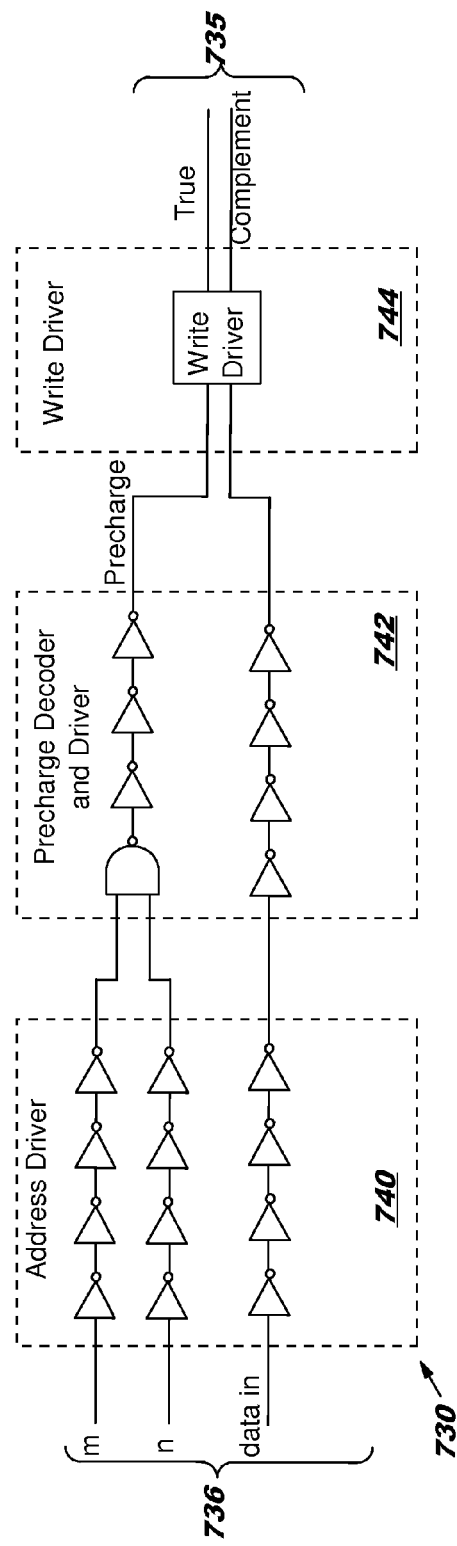

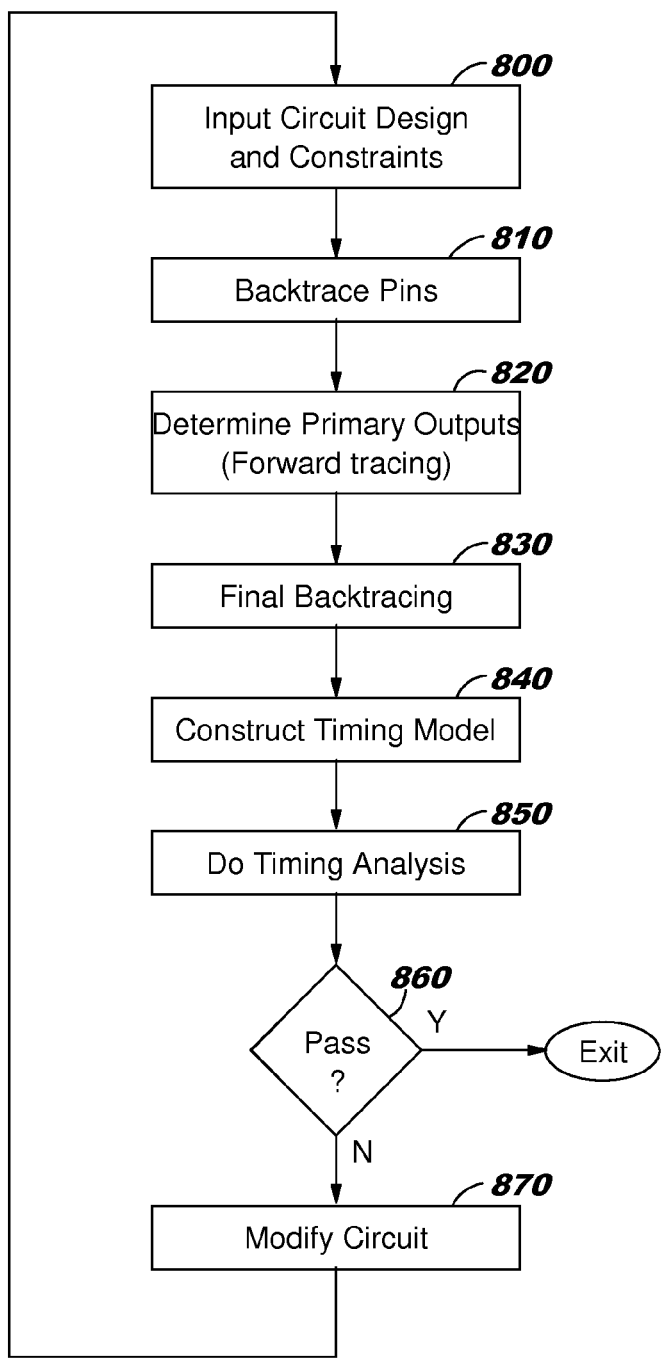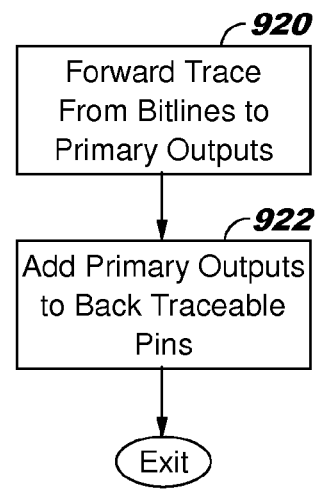

TIMING ANALYSIS OF AN ARRAY CIRCUIT CROSS SECTION

BACKGROUND

1. Technical Field

The present invention relates generally to timing analysis of an array, and in particular, to a computer implemented method for timing analysis of a cross section of an array circuit design.

2. Description of Related Art

Semiconductor memory designers test their circuit designs to check for a variety of issues including functionality, robustness and timing prior to having those designs implemented in silicon. For memory arrays, these circuit designs may be a schematic design in combination with a layout design. For testing, a netlist is extracted from the circuit design. A netlist generally conveys connectivity information and may include instances, nets and their attributes. An instance is a description of a part or device such as a transistor, resistor, capacitor or integrated circuit and may include a description of the device, the connections that can be made ("pins") to the device, and the basic properties of the device. Nets are the wires that connect instances in the designed circuit. There may be attributes associated with nets. A netlist is a compilation of the instances, nets and their attributes which describe the devices and connections between those devices within a circuit design.

Various types of testing may be performed on a netlist of the circuit design. One type of test is design verification to determine whether the circuit is functional and robust. Various software tools such as SPICE modeling may be used for design verification. Another type of test is static timing analysis for determining circuit performance and identifying timing constraints while accounting for variations in the technology process used to manufacture the circuit (process corners). Static timing analysis is a method of computing the expected timing of a circuit without requiring simulation. Various types of testing software may be used for performing timing analysis of a circuit design.

Testing a full extracted netlist of the whole circuit design such as static timing analysis could be prohibitively expensive and time consuming. As a result, designers may create a cross section netlist of their circuit design for testing purposes. Designers will try to create these cross section netlists so that the electrical and timing properties of the cross section netlist closely match those of a full extracted circuit design netlist. However, creating a cross section netlist is often time consuming and may not match the characteristics of the underlying circuit design.

SUMMARY

The illustrative embodiments provide a method, system, and computer usable program product for performing timing analysis on an array circuit including receiving in memory a set of pins to be timed, selecting with a data processor a cross section of the array circuit including the set of pins wherein a backtrace is performed from the set of pins to identify a set of bus groups, each bus group having a plurality of timing pins, and assigning timing for an assigned pin of a first bus group equal to timing calculated for a surrogate pin of the first bus group based on array circuit regularity.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIGS. 7A through 7C are block diagrams of cross section circuitry that may be backtraced in accordance with the first and second embodiments;

FIG. 8 is a high level flowchart of performing timing analysis of the cross section of the array circuit in accordance with the second embodiment;

FIG. 9 is a detailed flowchart forward tracing the cross section of the array circuit to identify primary outputs of the cross section in accordance with the second embodiment.

DETAILED DESCRIPTION

Steps may be taken to implement timing analysis of an array circuit design. These steps may be taken as will be explained with reference to the various embodiments below.

Figure 1:
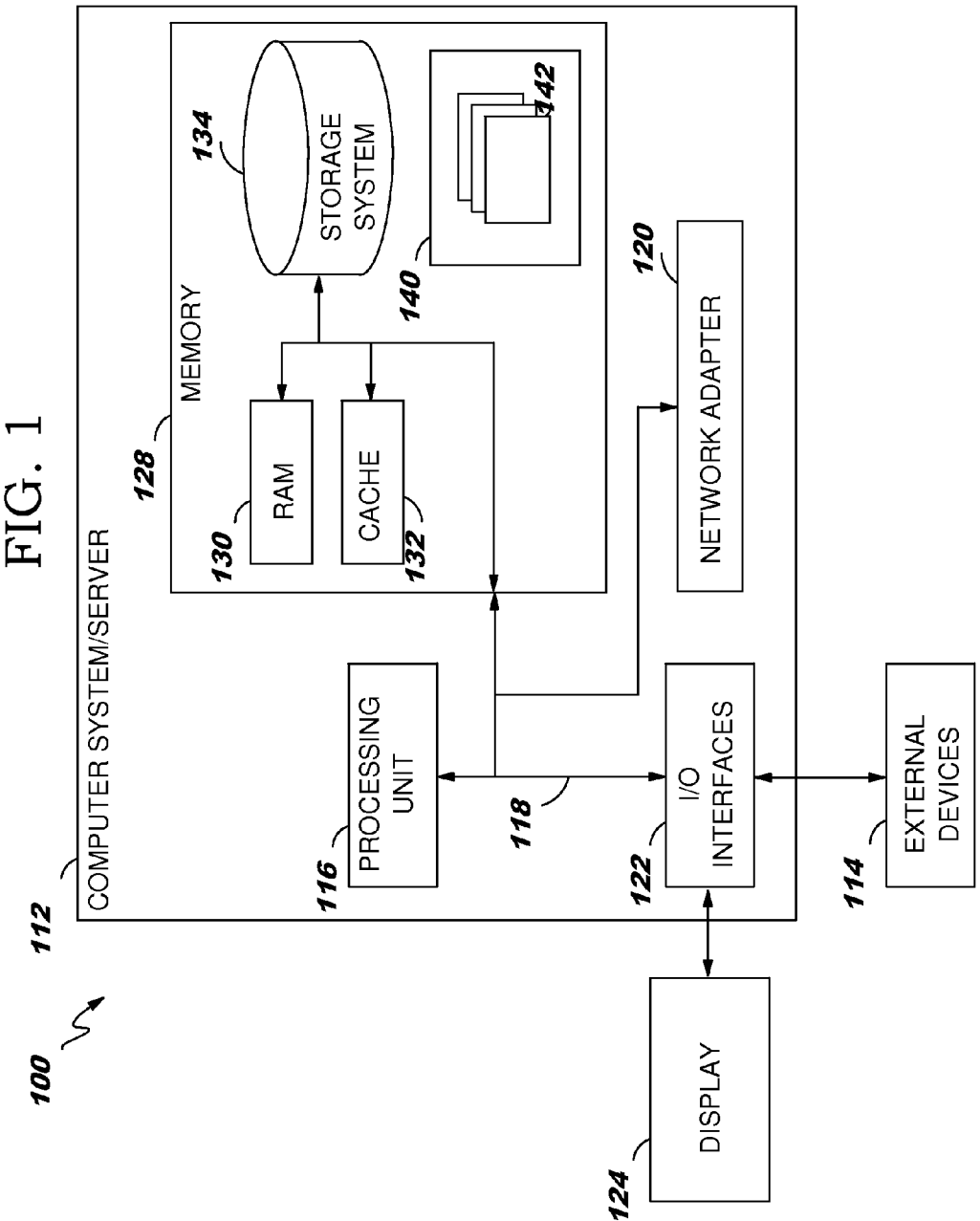
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, program modules 142 may include software for performing static timing analysis or other testing on a design of a memory array circuit.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
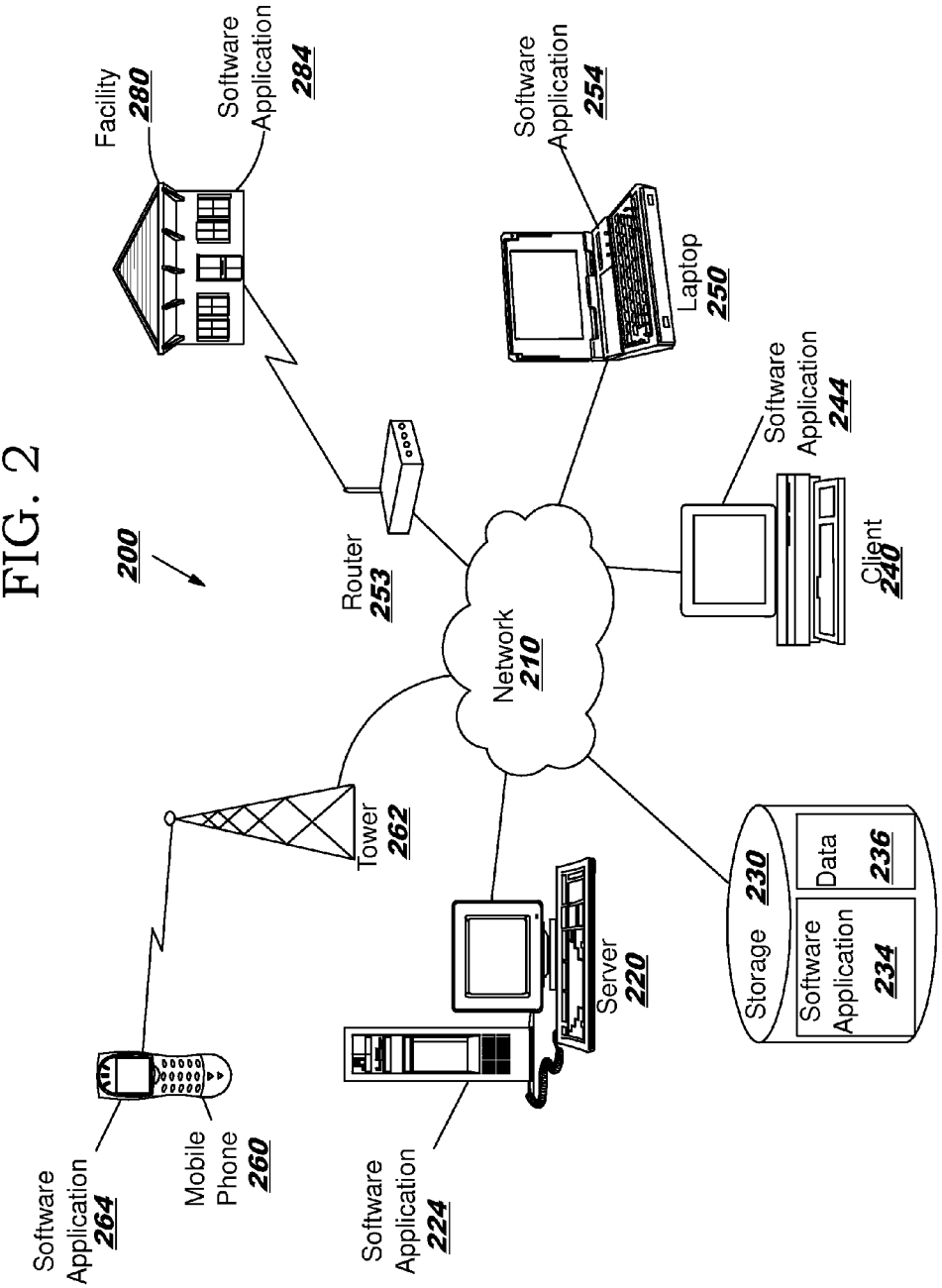
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 120, client 140, laptop 150, mobile phone 160 and facility 180 contain data and have software applications including software tools executing thereon. Other types of data processing systems such as personal digital assistants (PDAs), smartphones, tablets and netbooks may be coupled to network 210.

Server 220 may include software application 224 such as for testing circuit designs or other software applications in accordance with embodiments described herein. Storage 230 may contain software application 234 and a content source such as data 236 for testing circuit designs. Other software and content may be stored on storage 230 for sharing among various computer or other data processing devices. Client 240 may include software application 244. Laptop 250 and mobile phone 260 may also include software applications 254 and 264. Facility 280 may include software applications 284. Other types of data processing systems coupled to network 210 may also include software applications. Software applications could include a web browser, email, or other software application that can process timing analysis of a circuit or other type of information to be processed.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3A:
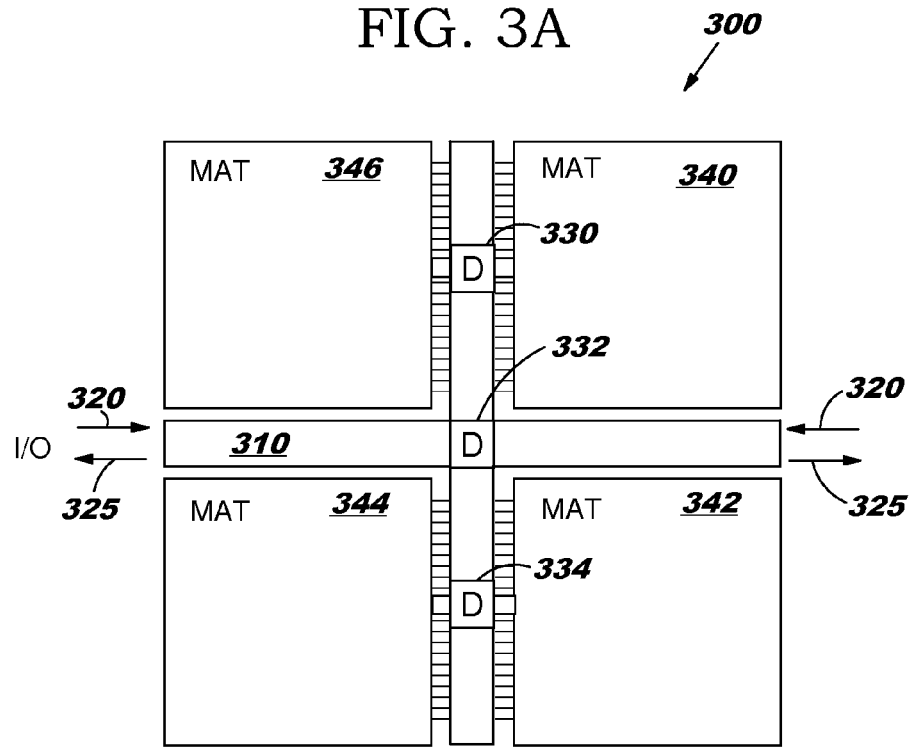
FIGS. 3A through 3C are block diagrams of an exemplary memory array circuit which may be tested in which various embodiments may be implemented.
Figure 3B:
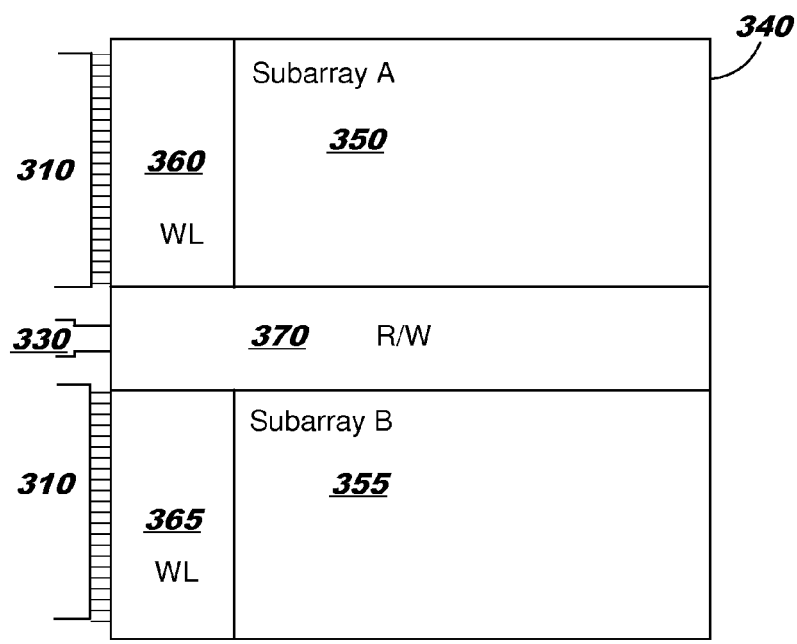
Figure 3C:
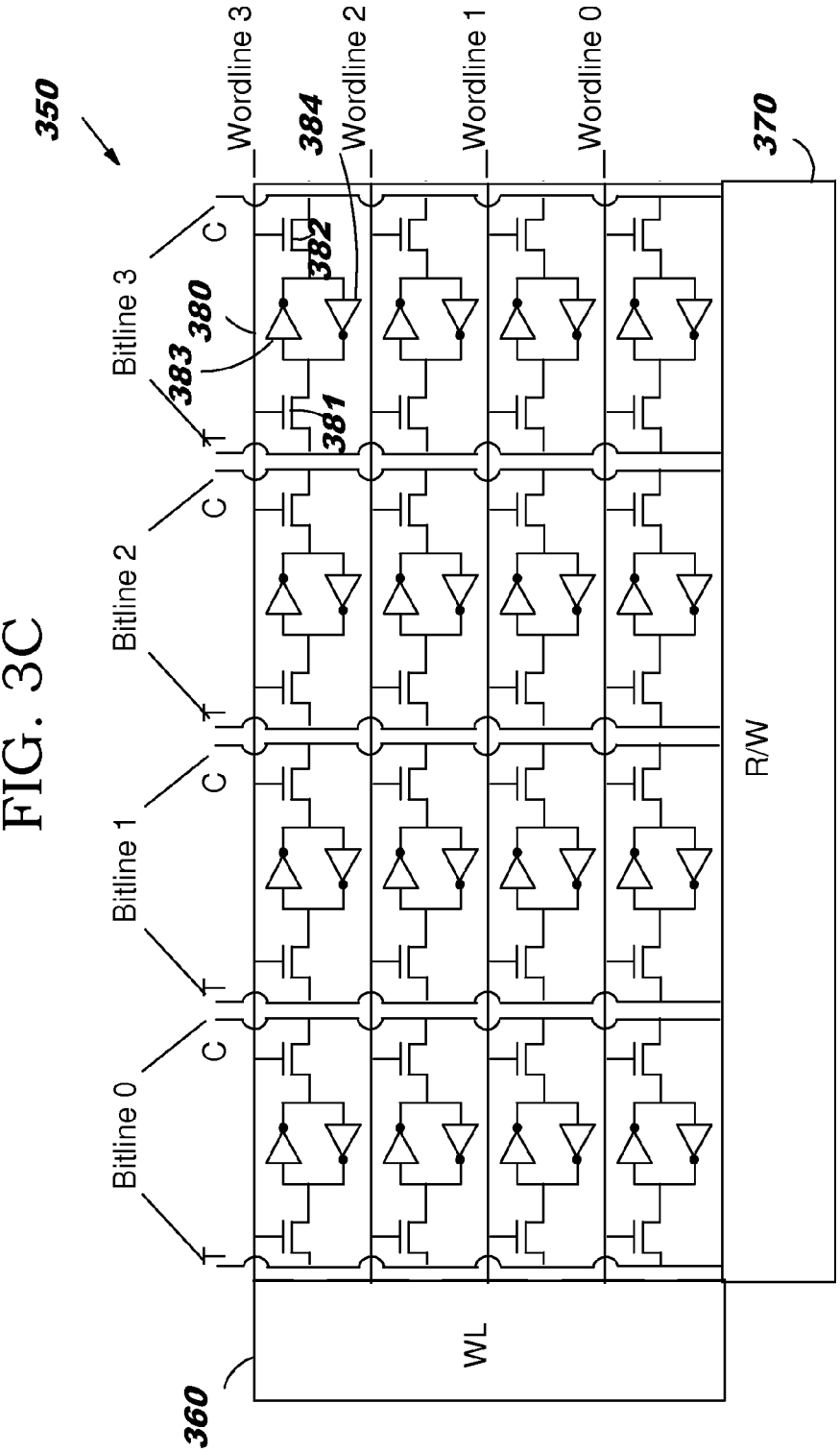

FIGS. 3A through 3C are block diagrams of an exemplary memory array circuit which may be tested in which various embodiments may be implemented. The memory array shown may be a DRAM (dynamic random access memory), although other types of memory arrays or other addressable arrays may be tested including volatile or nonvolatile memory such as SRAM (static random access memory), flash memory, etc.

FIG. 3A is a block diagram overview of a memory array circuit 300. Memory 300 includes a bus 310 for carrying input 320 and output 325 signals. These signals include power for providing power to the memory circuit, control signals for managing the operation of the memory circuit including read and write, address information for identifying a location in the array for an operation of read or write, data in for providing data to be written to an addressed location in the memory circuit, and data out for receiving data to be read from an addressed location in the memory circuit. Bus 310 also includes driving and distributing circuitry (DD) 330, 332 and 334 which include drivers, predecoding, decoding logic, and multiplexing circuitry for driving and distributing signals on the bus. Four mats 340, 342, 344, and 346 are also shown. Each mat includes memory cells and peripheral circuitry accessing those memory cells as described below.

FIG. 3B is a block diagram of mat 340. Each mat including mat 340 has two subarrays 350 and 355. Each subarray includes multiple data locations or memory cells for storing data. The memory cells in subarrays 350 and 355 are accessed or addressed using wordline decoders and drivers (WL) 360 and 365, respectively, as well as read evaluation circuitry and multiplexors and write data drivers (R/W) 370. WLs 360 and 365 are accessed through portions of bus 310 including through portions of DD 330, DD 332 and bus 310. R/W 370 is accessed through portions of DD 330, DD 332 and bus 310. Alternative memory circuits could be organized in many alternative arrangements.

FIG. 3C is a block diagram of subarray 350 including WL 360 and R/W 370. For illustrative purposes, subarray 350 is shown with sixteen memory cells in a four by four arrangement for storing sixteen bits of data. Subarray 350 could have millions of memory cells. A memory cell 380 is shown with circuitry including two transistors 381 and 382 and two inverters 383 and 384. Many alternative memory cells could be utilized with different circuit elements and layouts. Each memory cell may be read or written and is accessed by a wordline driven by WL 360 as well as a bitline driven by R/W 370. A bitline is a pair of lines (true and complement shown as T and C) from R/W 370 for accessing a column of cells. The pair of bitlines may be referred to as a bitcolumn. In this case, memory cell 380 is accessed with wordline 3 signaling a row of memory cells and bitline 3 signaling a column of memory cells with memory cell 380 being activated at the intersection. Because only cell 380 has received signals from WL 360 and R/W 370, then cell 380 may be read or written based on control signals (not shown).

Figure 4:
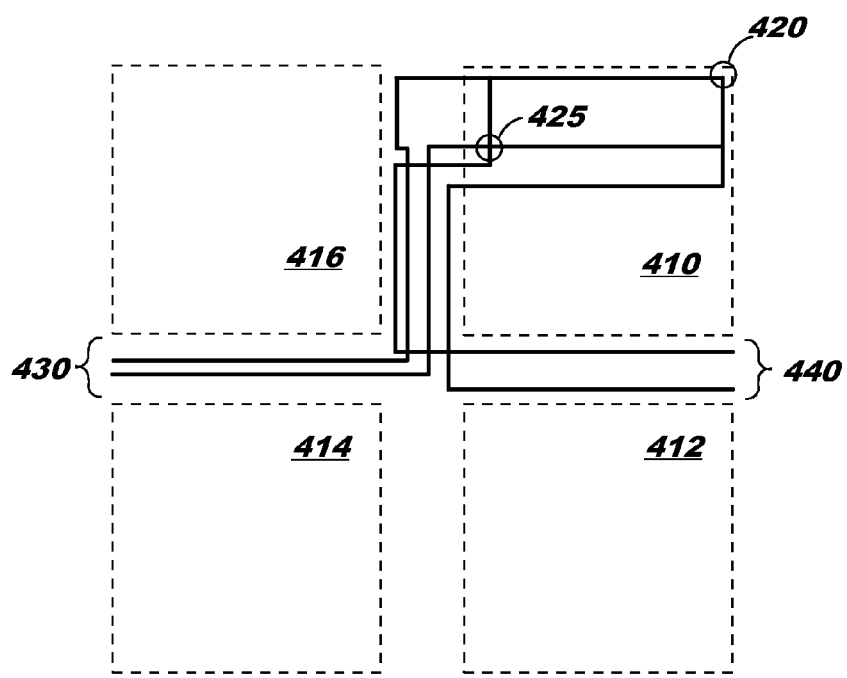
FIG. 4 is a block diagram showing a cross section of the array circuit which will be utilized for timing analysis in which various embodiments may be implemented.

FIG. 4 is a block diagram showing a cross section of the array circuit which will be utilized for timing analysis in which various embodiments may be implemented. In this example, four mats 410, 412, 414 and 416 are shown in outline form with the rest of the array not shown. These four mats correspond to elements 340, 342, 344 and 346 respectively of FIG. 3A. Two memory cells 420 and 425 and circuitry 430 and 440 leading to and from those two cells are to be tested. Memory cells 420 and 425 are from the upper right and lower left corners of the upper subarray of mat 410. Alternatively, different memory cells or more memory cells may be selected for timing analysis. Circuitry 430 includes wordlines activated by portions of bus 310, DDs 330 and 332, WL 360 and subarray 350. Circuitry 430 includes the address and control inputs, drivers, predecoding and decoding logic that are needed to activate the wordlines for accessing memory cells 420 and 425. Circuitry 440 includes bitlines activated by portions of bus 310, DDs 330 and 332, R/W 370 and subarray 350. Circuitry 440 includes the address, datain and control inputs, and dataout outputs that are needed for accessing certain bitlines and memory cells 420 and 425.

Figure 5:
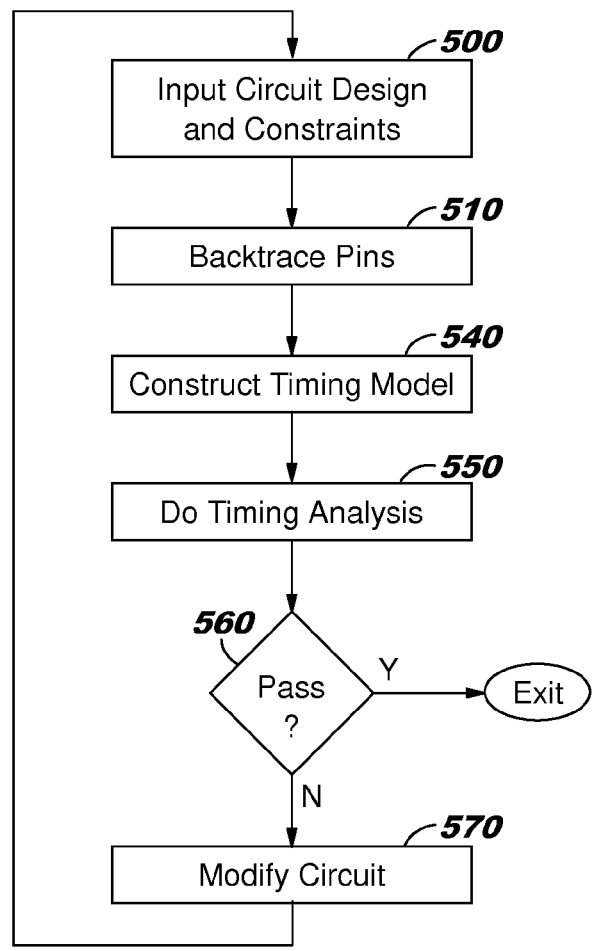
FIG. 5 is a high level flowchart of performing timing analysis of a cross section of the array circuit in accordance with a first embodiment.

FIG. 5 is a high level flowchart of performing timing analysis of a cross section of the array circuit in accordance with a first embodiment. This embodiment is implemented with a designer or tester providing a list of cells to be tested such as by static timing analysis and a list of external pins which may be driven during such timing analysis by the cells listed.

In a first step 500, the circuit design and various constraints of the array circuit is read or otherwise accessed by the timing analysis software. This provides the information needed for the timing analysis software to initiate constructing a cross section timing model of the array circuitry prior to performing static timing analysis of that timing model. This step is described in greater detail below with respect to FIG. 6A. In a second step 510, a backtrace of pins or nets in the netlist is performed. This allows the timing analysis software to determine which portions of the netlist may be relevant for constructing a timing model. The timing model can be constructed by a transistor level or gate or block level static timing analysis software. This step is described in greater detail below with respect to FIG. 6B. In a third step 540, a timing model of the circuit to be tested is constructed and is ready for timing analysis. This step is described in greater detail below with respect to FIG. 6C.

In step 550, timing analysis is carried out. This timing analysis could be carried out at various process corners in order to determine whether the circuit will be robust and meet timing requirements. Subsequently, it is determined in step 560 whether the timing model passed the tests. If yes, then the circuit design is ready for any next steps in bringing the array circuit to manufacturing. If not, then in step 570 the circuit array may be redesigned based on the results of the timing analysis. Subsequently, the timing analysis process begins again with step 500 described above.

Figure 6A:
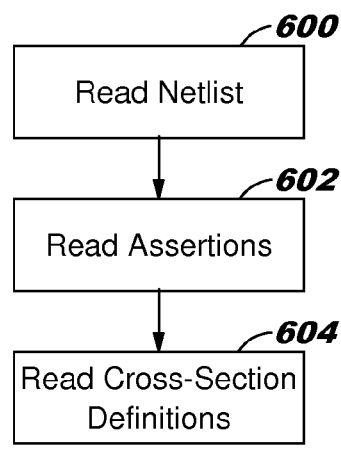
FIGS. 6A through 6C are detailed flowcharts of performing timing analysis of the cross section of the array circuit in accordance with the first embodiment and a second embodiment.
Figure 6B:
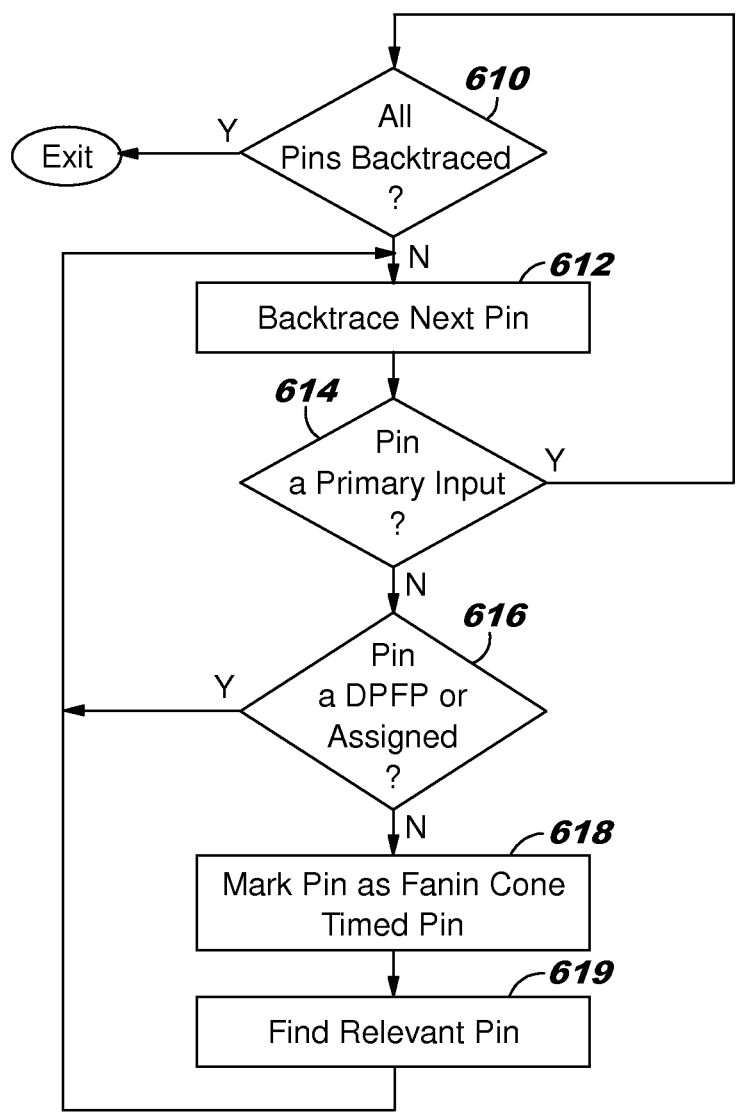
Figure 6C:
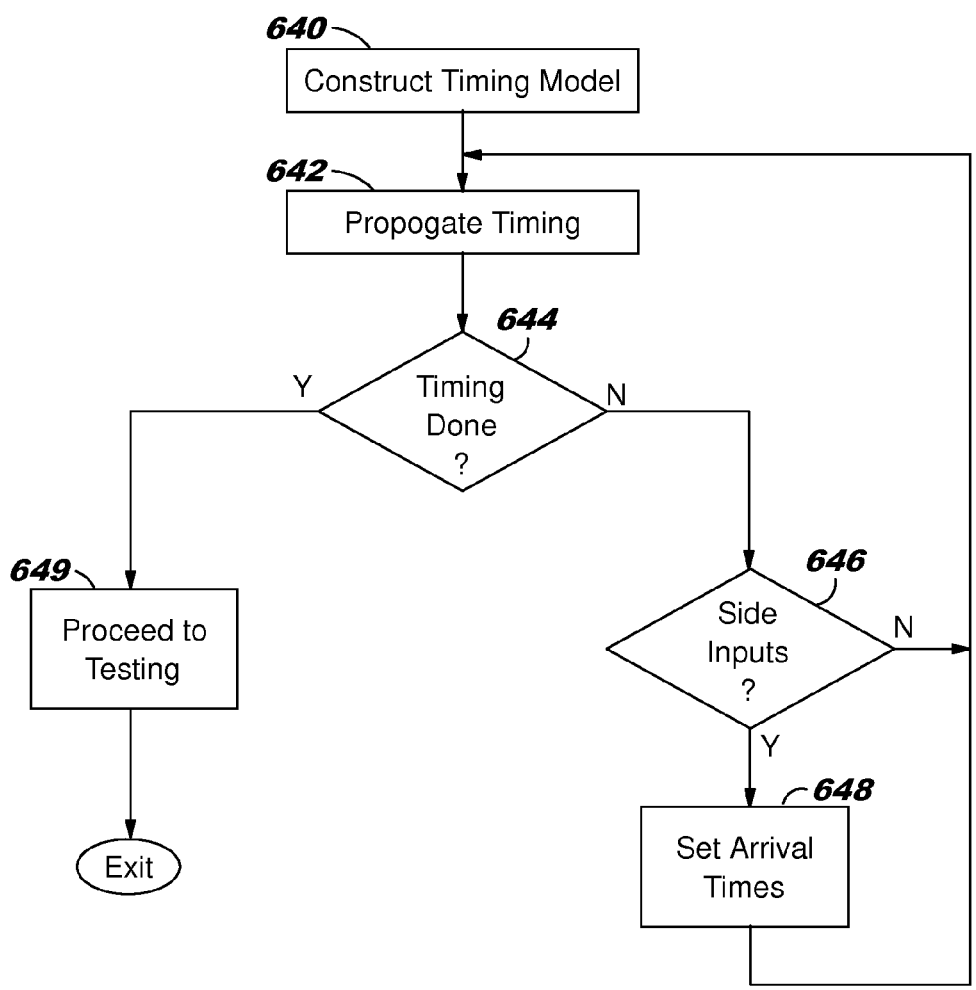

FIGS. 6A through 6C are detailed flowcharts of performing timing analysis of the cross section of the array circuit in accordance with the first embodiment and a second embodiment. These flowcharts illustrate the process steps to perform steps 500, 510 and 540 of FIG. 5 described above. These flowcharts also illustrate the process steps to perform steps 800, 810 and 840 of FIG. 8 described below.

FIG. 6A is a flowchart illustrating the timing analysis software reading the circuit design of a memory array circuit to be tested as generally described herein with reference to step 500 of FIG. 5 and step 800 of FIG. 8. In a first step 600, a netlist of the circuit design to be tested is read by the timing analysis software. A netlist describes the connectivity of the circuit design. This will allow the timing analysis software to utilize, as described below, the portions of the netlist relevant for timing analysis given the below described inputs and processes. In a second step 602, assertions are read or otherwise provided to the timing analysis software. These assertions include input characteristics such as signal arrival times to the input pins of the circuit design, output loading such as resistance and capacitance of the output pins of the circuit design, and constraints on the device such as required arrival times, slews, etc.

In a third step 604, a cross section definition of backtraceable pins, pins that should not to be propagated from (as decided by a designer or tester), and regular bus groups are read or otherwise provided to the timing analysis software. That is, those nets or pins that may be backtraceable are identified for backtracing. This includes the wordline and bitline location of memory cells to be tested so the circuitry driving those wordlines may be backtraced. In the first embodiment, this also includes a list of external pins which may be driven during timing analysis by the memory cells to be tested. This allows the timing analysis software to backtrace from the external pins to the bitlines accessing the memory cells to be tested.

Pins are at any location in a circuit design between devices such as capacitors, resistors and transistors or between compilations of devices such as inventors, NAND gates, etc. An external pin is a pin location between a device and the exterior of the circuit design such as a chip pin. However, in the case of a multi-device chip, the exterior pin may be the connection point between the circuit design and other circuit designs such as between an SRAM incorporated into a microprocessor.

The designer or tester may decide that certain pins should not be backtraced. This decision may be made because those pins and the circuitry behind them may not impact the timing analysis of the circuit in the opinion of the designer or tester. This allows a further reduction of the size of the circuit to be tested. These pins are referred to herein as don't propagate from pins or DPFP.

The designer or tester may also decide that certain pairs of pins for a given device are equivalent. That is, due to the regular structure of the array circuit, the input from one pin would be the equivalent of the input from another pin for the same device. For example, timing of certain outputs of certain circuit blocks may depend on arrival times of simultaneously switching inputs. Sometimes these simultaneously switching inputs may be bits of a bus. In a cross section, because of the regularity in the logic and layout of different bits of a bus, designers or testers may desire to incorporate the fanin cone circuitry of just one bit of the bus. That is, the strong similarity or equivalence of logic and layout of different sections of the array circuit (i.e. regularity or equivalency) may cause multiple pins of the same bus group to have equivalent timing. This regularity allows assigning the timing of a surrogate pin to one or more assigned pins, presumably of the same bus group. This assigning of timing from a surrogate pin to one or more assigned pins allows for a reduction in the size and complexity of a cross section to be tested, thereby speeding up timing analysis of that cross section. For this condition it becomes necessary to attribute timing to the other bits of the bus whose fanin cone circuitry designers don't wish to include in the cross section. In order to assign timing to these other bits of the bus, a regular bus group is identified by the designer or tester. A regular bus group is composed of a surrogate pin and assigned pins. The timing of the assigned pin is set to be identical to that of the surrogate pin. An example of this is provided in FIG. 7C below.

FIG. 6B is a flowchart illustrating the timing analysis software performing an initial backtrace of the nets in the netlist as generally described herein with reference to step 510 of FIG. 5 and steps 810 and 830 of FIG. 8. In step 610, it is determined whether all pins have been backtraced. If not, such as the first time through this process, then processing continues to step 612. Otherwise, processing exits. In step 612, the next untraced pin is backtraced to a pin further upstream of the current pin. This is a process performed by reviewing the netlist and looking for pin(s) upstream to the device(s) connected to the current pin. Upstream is defined as being earlier in timing for the given pin. For example, if a signal is being propagated through a device, then upstream would be a pin earlier in timing on another connection to the device that the current pin. Once completed, then processing continues to step 614 where it is determined whether the backtraced pin is a primary input. A primary input is an identified primary input in the assertions such as an external input pin whereby no further backtracing may be performed. Another example in the first embodiment would be the memory cell being tested when backtracing from an external output pin. If yes in step 614, then processing returns to step 610. If not, then processing continues to step 616. Step 614 is recursive. That is, if backtracing one pin identifies one or more pins upstream, then each of the backtraced pins would need to be further backtraced.

In step 616, it is determined whether the current pin is a DPFP (don't propagate from pin) or an assigned pin. If yes, then processing returns to step 612. If not, then the pin (net) is not a surrogate pin or a DPFP and processing continues to step 618. In step 618, the pin is marked as a fanin cone timed pin. Subsequently in step 619, all pins which may influence the timing of the fanin cone timed pin are identified and processing returns to step 612.

FIG. 6C is a flowchart illustrating the timing analysis software constructing a timing model of the extracted memory circuit as generally described herein with reference to step 540 of FIG. 5 and step 840 of FIG. 8. In step 640, a timing model is generated based on the extracted memory array circuit. This timing model in generated for all propagation segments between pins that were marked as timed pins in step 618. Subsequently, timing is propagated between the marked pins in step 642. In step 644, it is determined whether the timing model is complete. If not, then in step 646, it is determined whether the timing of current propagation depends on side inputs that are assigned pins. If not, then processing returns to step 642. Otherwise, in step 648 the arrival times of assigned pins are set to be equal to that of the surrogate pins. After step 648, processing returns to step 642. If the timing model was complete in step 644, then the timing model is ready for timing analysis and processing can proceed to static timing testing of the memory array circuit in step 649.

Figure 7C:
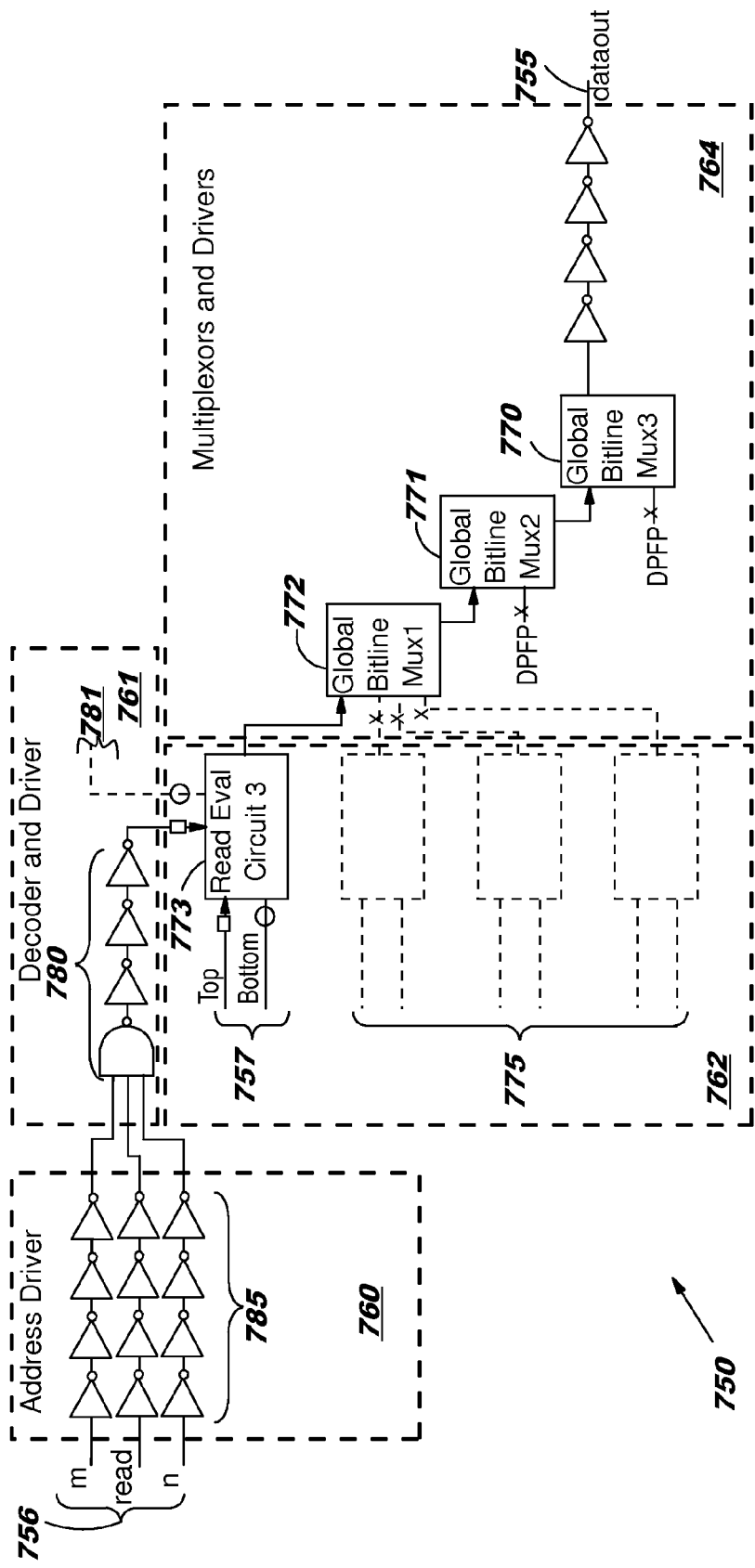

FIGS. 7A through 7C are block diagrams of cross section circuitry that may be backtraced in accordance with the first and second embodiments. FIG. 7A is a block diagram of cross section circuitry 700 backtraced from a wordline 705 to external input pins 706 thereby illustrating the process of generating a fanin cone 700 for wordline 705. This circuitry may be utilized during a read operation or a write operation for accessing the wordline of a memory cell being tested. This circuitry includes an address driver 710, a wordline predecoder and driver 712 and a wordline decoder and driver 714 with inputs 706 and wordline 705. With reference to FIGS. 3A through 3C, address driver 710 may be found in bus 310, wordline predecoder and driver 712 may be found in DDs 330 and 332, and wordline decoder and driver 714 may be found in WL 370.

The process of backtracing starts at pin 720 where the wordline 705 connects to a memory cell to be tested. The first step of backtracing (see step 610 of FIG. 6B described above) from pin 720 will identify pin 722. This pin is not a primary input (an external input pin in this case), so backtracing will continue. This process repeats sequentially until pin 726 in front of the NAND gate is backtraced. Backtracing will reveal two pins 728 and 729, neither of which is a primary input. As a result, both pins will be backtraced recursively as described above with reference to step 614 of FIG. 6B. Additional backtracing will continue pursuant to the process steps of FIG. 6B until the four external input pins 706 (p, q, r and s) are identified. At this time, backtracing will cease for wordline 705. The result is fanin cone 700 of wordline 705.

FIG. 7B is a block diagram of cross section circuitry 730 backtraced from a bitline 735 to external input pins 736 thereby illustrating the process of generating a fanin cone 730 for bitline 735. This circuitry may be utilized during a write operation for accessing the bitline of a memory cell being tested. This circuitry includes an address driver 740, a precharge decoder and driver 742 and a write driver 744 with inputs 756 and wordline 755. With reference to FIGS. 3A through 3C, address driver 740 may be found in bus 310, decoder and driver 742 may be found in DDs 330 and 332, and write driver 744 may be found in R/W 370. The result is fanin cone 730 of bitline 735.

FIG. 7C is a block diagram of cross section circuitry 750 backtraced from an external dataout pin 755 identified by a designer or tester to the bitlines 757 of a memory cell being tested and further to address lines 756 addressing bitlines 757, thereby illustrating the process of generating a fanin cone for external pin 755. This circuitry may be utilized during a read operation for accessing the bitline of a memory cell being tested.

The backtracing process starts at dataout external pin 755 which was identified by the designer or tester in step 604 of FIG. 6A. The circuit is backtraced through multiplexors and drivers 764, read evaluation circuits 762, decoder and driver 761, and address driver 760. With reference to FIGS. 3A through 3C, multiplexors and drivers 764 may be found in DDs 331 and 332, read evaluation circuits 762 may be found in R/W 370, decoder and driver 761 may be found in DDs 330 and 332, and address driver 760 may be found in bus 310.

The backtracing is performed one pin and device at a time through the inverters of 764 to global bitline mux3 770 (a multiplexor). In this example, one of the inputs for mux3 is a DPFP as defined and provided by the designer or tester in step 604 of FIG. 6A. For ease of reference, a DPFP is indicated with an X in FIG. 7C. This was provided because the designer or tester did not want to incorporate the fanin cone of the DPFP in the cross section. As a result, that alternate pathway does not need to be backtraced, thereby saving time for backtracing and timing analysis. Backtracing continues through mux2 771 and mux1 772. Mux1 has four inputs, three of which are identified as DPFPs by a designer or tester, again saving time in backtracing and timing analysis. For example, no backtracing or timing analysis is needed for circuits 775 shown in outline form.

Global bitline mux1 is then backtraced to read eval (evaluation) circuit3 773. Read eval circuit3 773 is used for reading the values off of bitlines coupled to memory cells during a read operation. This read eval circuit has two inputs 757 including one bitline for the top subarray and the other bitline for the bottom subarray. The timing of the read eval circuit3 depends on the timing of both top and bottom bitlines. However, because of regularity, the designer or tester may set the bottom bitline as an assigned pin (small circle) and the top bitline as its surrogate pin (small square). As described above, the timing of the assigned pin is set to be identical to the surrogate pin, thereby avoiding tracing the fanin cone of the assigned pin (bottom bitline). For ease of reference, an assigned pin is shown as a small circle with a surrogate pin shown as a small square.

Backtracing fanin cone 750 then continues up through the addressing and read control input for read eval circuit3 to NAND gate and inverters 780, continuing through inventors 785 of address driver 760, to pins 756 including address pins m and n and the read input pin. There is another parallel set of circuitry 781 that is also an input to a second read port control input (for the bottom bitline) to read eval circuit3. Because of regularity, this second read port control input is set to be an assigned pin (small circle) by the designer or tester with the first read port control input (for the top bitline) as its surrogate pin (small square). This completes the fanin cone for dataout line 755.

FIG. 8 is a high level flowchart of performing timing analysis of the cross section of the array circuit in accordance with the second embodiment. This embodiment is implemented with a designer or tester providing a list of cells to be tested such as by static timing analysis. Due to the capability of forward tracing, this embodiment does not require the designer or tester to provide a list of external pins which may be driven during such timing analysis.

In a first step 800, the circuit design and various constraints of the array circuit is read or otherwise accessed by the timing analysis software. This provides the information needed for the timing analysis software to initiate constructing a test model of the array circuitry. This step is described in greater detail above with respect to FIG. 6A. In a second step 810, a backtrace of nets in the netlist is performed. This allows the timing analysis software to determine which portions of the netlist are relevant for constructing a timing analysis model. This step is described in greater detail above with respect to FIG. 6B. In step 820, the primary outputs are identified through a process of forward tracing. This step is described in greater detail below with respect to FIG. 9. In step 830, a final backtracing is performed on the primary outputs identified in step 820. This step is described in greater detail above with respect to FIG. 6B.

In step 840, a timing model of the circuit to be tested is constructed and is ready for timing analysis. This step is described in greater detail above with respect to FIG. 6C. In step 850, timing analysis is carried out. This timing analysis could be carried out at various process corners in order to determine whether the circuit will be robust and meet timing requirements. Subsequently, it is determined in step 860 whether the timing model passed the tests. If yes, then the circuit design is ready for any next steps in bringing the array circuit to manufacturing. If not, then in step 870 the circuit array may be redesigned based on the results of the timing analysis. Subsequently, the timing analysis process begins again with step 800 described above.

Figure 10:
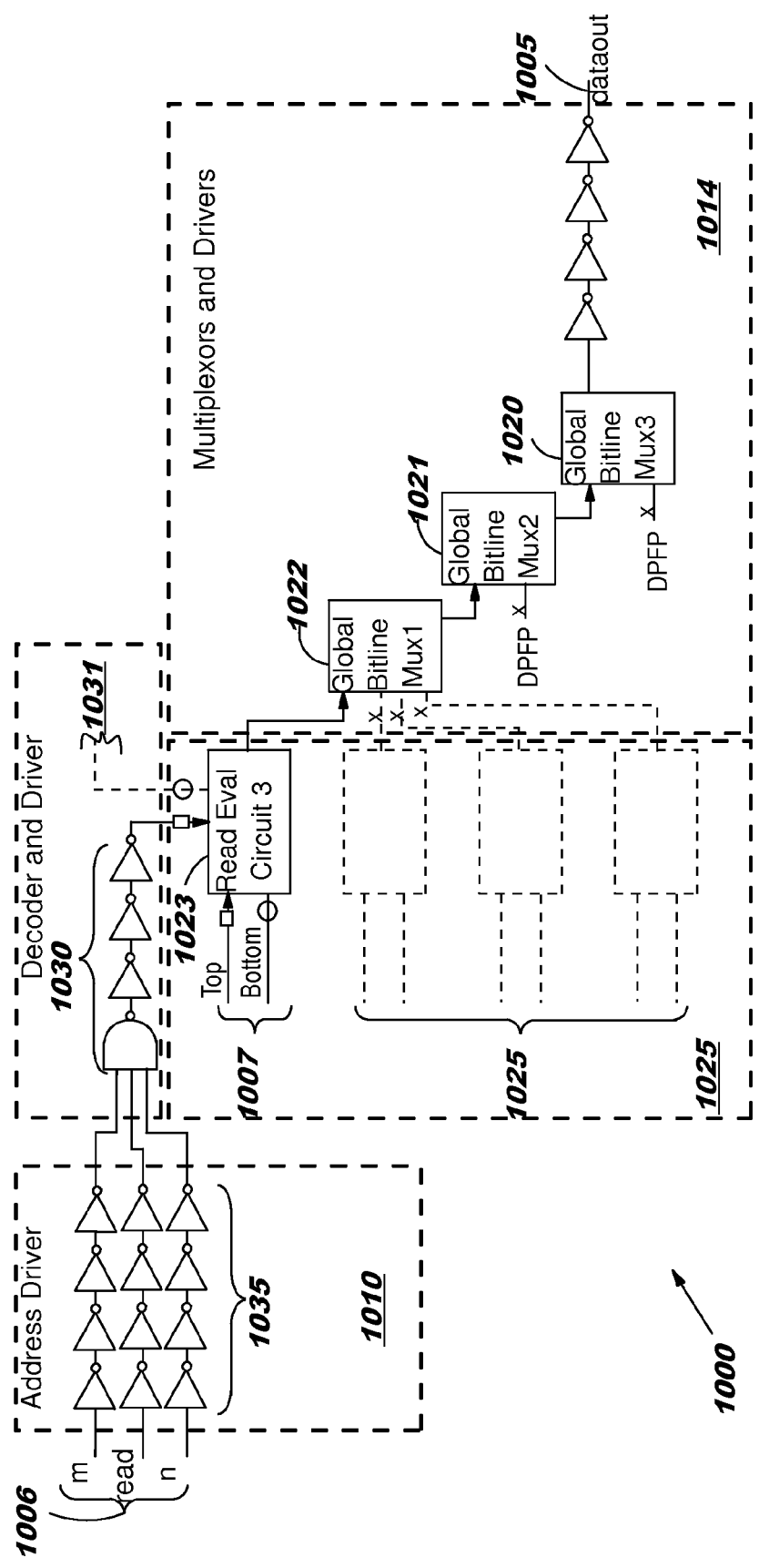
FIG. 10 is a block diagram of cross section circuitry forward traced and backtraced from a memory cell bitline in accordance with the second embodiment.

FIG. 9 is a detailed flowchart forward tracing the cross section of the array circuit to identify primary outputs of the cross section in accordance with the second embodiment. This process is described generally above with reference to step 820 of FIG. 8. In a first step 920 all bitlines are forward traced to primary outputs. This is accomplished by starting at a pin connecting a memory cell to be tested with a bitline. That pin is then forward traced across the next upstream device to the next pin. Upstream is defined as a point earlier in timing when performing an operation such as a read. The forward tracing continues until an external pin is reached. That external pin will then be the primary output for the memory cell in a read operation. This process is repeated for each memory cell to be tested. An example of forward tracing is illustrated in FIG. 10 and described below. In a second step 922, the primary outputs identified in step 920 are the added to the list of backtraceable pins. These pins will then be backtraced in step 830 of FIG. 8 as described above.

FIG. 10 is a block diagram of cross section circuitry forward traced and backtraced from a memory cell bitline in accordance with the second embodiment. This block diagram illustrates the process of generating a fanin cone 1000 from dataout pin 1005 to address pins 1006 and bitlines 1007. This circuitry may be utilized during a read operation for accessing the bitline of a memory cell being tested.

The forward tracing starts in this example at top bitline 1007 and proceeds one pin and device at a time. The initial device encountered is read eval circuit3 1023. That device is identified and the input to that device is then followed to global bitline mux1 1022, global bitline mux2 1021, global bitline mux3 1020 and four inverters to external dataout pin 1005. Through forward tracing, external dataout pin 1005 is thus identified to be an output whose timing is influenced by bitline 1007. This set of devices and connections are the devices identified in the forward tracing of step 820 of FIG. 8 described above.

A backward tracing process then begins starting at external dataout pin 1005 to determine the entire fanin cone of dataout pin 1005. This fanin cone would thus include all main and side inputs that can influence the timing of external dataout pin 1005. The circuit is then backtraced through multiplexors and drivers 1014, read evaluation circuits 1012, decoder and driver 1011, and address driver 1010. With reference to FIGS. 3A through 3C, multiplexors and drivers 1014 may be found in DDs 331 and 332, read evaluation circuits 1012 may be found in R/W 370, decoder and driver 1011 may be found in DDs 330 and 332, and address driver 1010 may be found in bus 310.

The backtracing is performed one pin and device at a time through the inverters of 1014 to global bitline mux3 1020 (a multiplexor). In this example, one of the inputs for mux3 is a DPFP as defined and provided by the designer or tester in step 604 of FIG. 6A. For ease of reference, a DPFP is indicated with an X in FIG. 10. This was provided because the designer or tester did not want to incorporate the fanin cone of the DPFP in the cross section. As a result, that alternate pathway does not need to be backtraced, thereby saving time for backtracing and timing analysis. Backtracing continues through mux2 1021 and mux1 1022. Mux1 has four inputs, three of which are identified as DPFPs by a designer or tester, again saving time in backtracing and timing analysis. For example, no backtracing or timing analysis is needed for circuits 1025 shown in outline form.

Global bitline mux1 is then backtraced to read eval circuit3 1023. Read eval circuit3 1023 is used for reading the values off of bitlines coupled to memory cells during a read operation. This read eval circuit has two inputs 1007 including one bitline for the top subarray and the other bitline for the bottom subarray. Since we are only testing memory cells from the top subarray in this example, the input from the bottom subarray will not be needed. However, in order to test the circuit properly, both inputs may be needed in order to show the load that may be handled by read eval circuit3. The timing of the read eval circuit3 depends on the timing of both top and bottom bitlines. However, because of regularity, the designer or tester may set the bottom bitline as an assigned pin (small circle) and the top bitline as its surrogate pin (small square). As a result the designer or tester has set both of those inputs as a bus group with an assigned pin (the top pin) and the other input as an assigned pin (the bottom pin). As described above, the timing of the assigned pin is set to be identical to the surrogate pin, thereby avoiding tracing the fanin cone of the assigned pin (bottom bitline). For ease of reference, an assigned pin is shown as a small circle with a surrogate pin shown as a small square.

Backtracing this fanin cone 1000 then continues up through the addressing and read control input for read eval circuit3 to NAND gate and inverters 1030, continuing through invertors 1035 of address driver 1010, to pins 1006 including address pins m and n and the read input pin. There is another parallel set of circuitry 1031 that is also an input to a second read port control input (for the bottom bitline) to read eval circuit3. Because of regularity, this second read port control input is set to be an assigned pin (small circle) by the designer or tester with the first read port control input (for the top bitline) as its surrogate pin (small square). This completes the fanin cone for dataout line 1005 which was forward traced from the bitline of the memory cell being tested.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as software for testing circuit designs by using timing analysis. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for performing timing analysis on an array circuit comprising:
    receiving, in memory, a set of pins to be timed;
    selecting, with a data processor, a cross section of the array circuit including the set of pins wherein a backtrace is performed by the data processor from the set of pins to identify a set of bus groups, each bus group having a plurality of timing pins;
    assigning timing for an assigned pin of a first bus group equivalent to timing calculated by the data processor for a surrogate pin of the first bus group based on array circuit regularity, wherein a further backtrace is performed by the data processor from the surrogate pin and not from the assigned pin; and
    calculating timing of the array circuit through the surrogate pin.

2. The method of claim 1 wherein the set of pins to be timed includes a set of memory cells to be timed.

3. The method of claim 2 wherein the set of memory cells are identified by a set of wordlines and a set of bitlines accessing the set of memory cells.

4. The method of claim 3 further comprising performing a forward trace from one of the set of bitlines to an external output pin.

5. The method of claim 4 further comprising performing a second backtrace from the external pin to one of the set of bitlines.

6. The method of claim 5 wherein the second backtrace is further performed from one of the set of bitlines to an external input pin.

7. The method of claim 1 wherein the backtrace does not backtrace through a pin identified as a pin not to be propagated.

8. The method of claim 6 wherein the backtrace does not backtrace through a pin identified as a pin not to be propagated.

9. A computer usable program product comprising a non-transitory computer usable storage medium including computer usable code for use in performing timing analysis on an array circuit, the computer usable program product comprising code for performing the steps of:

receiving, in memory, a set of pins to be timed;

selecting, with a data processor, a cross section of the array circuit including the set of pins wherein a backtrace is performed by the data processor from the set of pins to identify a set of bus groups, each bus group having a plurality of timing pins;

assigning timing for an assigned pin of a first bus group equivalent to timing calculated by the data processor for a surrogate pin of the first bus group based on array circuit regularity, wherein a further backtrace is performed by the data processor from the surrogate in and not from the assigned pin; and calculating timing of the array circuit through the surrogate in.

10. The computer usable program product of claim 9 wherein the set of pins to be timed includes a set of memory cells to be timed.

11. The computer usable program product of claim 10 wherein the set of memory cells are identified by a set of wordlines and a set of bitlines accessing the set of memory cells.

12. The computer usable program product of claim 11 further comprising the step of performing forward trace from one of the set of bitlines to an external output pin.

13. The computer usable program product of claim 12 further comprising the step of performing a second backtrace from the external output pin to one of the set of bitlines.

14. The computer usable program product of claim 13 wherein the second backtrace is further performed from one of the set of bitlines to an external input pin.

15. The computer usable program product of claim 9 wherein the backtrace does not backtrace through a pin identified as a pin not to be propagated.

16. A data processing system for performing timing analysis on an array circuit, the data processing system comprising:

a processor; and a memory storing program instructions which when executed by the processor execute the steps of:

receiving, in the memory, a set of pins to be timed;

selecting, with the data processor, a cross section of the array circuit including the set of pins wherein a backtrace is performed by the data processor from the set of pins to identify a set of bus groups, each bus group having a plurality of timing pins;

assigning timing for an assigned pin of a first bus group equivalent to timing calculated by the data processor for a surrogate pin of the first bus group based on array circuit regularity, wherein a further backtrace is performed by the data processor from the surrogate in and not from the assigned pin; and calculating timing of the array circuit through the surrogate in.

17. The data processing system of claim 16 wherein the set of pins to be timed includes a set of memory cells to be timed.

18. The data processing system of claim 17 wherein the set of memory cells are identified by a set of wordlines and a set of bitlines accessing the set of memory cells.

19. The data processing system of claim 18 further comprising the step of performing forward trace from one of the set of bitlines to an external output pin.

20. The data processing system of claim 19 wherein the second backtrace is further performed from one of the set of bitlines to an external input pin.

* * * * *